US008495671B1

(12) United States Patent
Ribeiro et al.

(10) Patent No.: US 8,495,671 B1
(45) Date of Patent: Jul. 23, 2013

(54) INTERACTIVE VIDEO SYSTEM

(75) Inventors: Aldemaro Ribeiro, Miami, FL (US); Sam Johnson, Suwanee, GA (US)

(73) Assignee: Freeview Network, LLC

( * ) Notice: Subject to any disclaimer, the term of this patent is extended or adjusted under 35 U.S.C. 154(b) by 1255 days.

(21) Appl. No.: 10/113,882

(22) Filed: Apr. 1, 2002

Related U.S. Application Data

(60) Provisional application No. 60/280,084, filed on Apr. 2, 2001.

(51) Int. Cl.
*H04H 60/33* (2008.01)
(52) U.S. Cl.
USPC .............. 725/13; 725/11; 725/22; 725/23
(58) Field of Classification Search
None
See application file for complete search history.

(56) References Cited

U.S. PATENT DOCUMENTS

| | | | | | |
|---|---|---|---|---|---|
| 4,816,904 | A | * | 3/1989 | McKenna et al. | 725/11 |
| 5,438,356 | A | * | 8/1995 | Ushiki et al. | 725/5 |
| 5,680,177 | A | * | 10/1997 | Abe | 348/564 |
| 5,926,231 | A | * | 7/1999 | Jung | 348/699 |
| 6,130,726 | A | * | 10/2000 | Darbee et al. | 348/734 |
| 6,240,555 | B1 | * | 5/2001 | Shoff et al. | 725/110 |
| 6,597,405 | B1 | * | 7/2003 | Iggulden | 348/553 |
| 7,222,354 | B1 | * | 5/2007 | Ching et al. | 725/35 |
| 7,293,279 | B1 | * | 11/2007 | Asmussen | 725/102 |
| 2002/0013942 | A1 | * | 1/2002 | Kim | 725/32 |
| 2002/0019769 | A1 | * | 2/2002 | Barritz et al. | 705/14 |
| 2003/0158776 | A1 | * | 8/2003 | Landesmann | 705/14 |

OTHER PUBLICATIONS

Jon Lafayette, Adds on VOD Seen as Counter to Skipping, tvweek.com, www.tvweek.com/article.cms?articleID=26175, Oct. 4, 2004.
Tom Gilbert, A VOD model that can work for everyone, Electronic Media, Editorial.
James R. Hagarty, Judge's Ruling on Pop-Up Ads Is a Blow to Web-Site Operators, Wall Street Journal, Moday Sep. 8, 2003, p. A3 and A5.
Bob Keefe, TV Execs plot ways to keep eyeballs Atlanta Journal Constitution.
Alan. I. Light, CNN's new format is 'jumbled mess', USA Today.
Jim Lovel, Advertisers focus on sp . . . , Atlanta Business Chronicle.
Vanesa O'Connell, Ad Slump May Be Worse Than Thought.
Michael McCarthy, Ads are here, there, everywhere, USA Today, Jun. 19, 2001.
Terry Lefton, Playing the Ad Market, The Industry Standard, Jul. 30, 2001.
Matthew T. Felling, Updated Headline News Sets channel on fluff cycle.
Daisy Whitney, A 'TiVo-Proof' Ad Model, Vision Week, May 7, 2004.
Louis Chunovic, Satellite TV hits Stores.
Curtis Rist, Should you ad go here?, http://money.cnn.com/2004/03/04/technology/business2_adds/.
Jack Myers, Outdoor Sets Sites on Doubling Share-of-Market with Research & Tech Upgrades, Jack Myers Report, Mar. 3, 2004.

* cited by examiner

*Primary Examiner* — Chenea Smith
(74) *Attorney, Agent, or Firm* — Weide & Miller, Ltd.

(57) ABSTRACT

This application discloses a system and method for the delivery of television programming comprising of: a video source connected to a subscriber network to transport a primary video signal; a message source connected to said subscriber network to transport a supplemental video signal; wherein the primary and supplemental video signals are combined to display the primary and supplemental video signals concurrently. In an exemplary embodiment of the invention, the subscriber receives discounts relative to the amount of supplemental video signal that is viewed by the subscriber.

9 Claims, 3 Drawing Sheets

INTERACTIVE VIDEO SYSTEM

RELATED APPLICATIONS

This application claims priority based on U.S. Provisional Application No. 60/280,084 filed on Apr. 2, 2001.

FIELD OF THE INVENTION

The invention relates to systems and methods to combine a supplemental video signal with a primary video signal. This invention could combine these signals either at the subscriber's location or could send a combined signal to the subscriber. The subscriber could receive discounts relative to the amount of supplemental video signal that is viewed by the subscriber.

BACKGROUND OF THE INVENTION

To date most television content provides "free viewing" paid by advertisers inserting advertising messages into periodic breaks in the televisions content, an "out-of-content" advertising method. In the past few years, a "pay for viewing" method has been used where the television viewer pays a fee to watch a channel, known as a "subscription channel" or "pay-per-view channel". Some content providers use a combination of both methods, but almost all advertisers use the "out-of-content" advertising method. In addition to the content providers, the system or service providers, such as cable operators or satellite providers, charge a fee for bundling all the content into an ensemble which provides access by a single system. The system or service providers charge a monthly access fee for the ensemble of programming and lease the subscriber a receiver or sell a receiver which provides access to the system. The system or service provider will also charge the subscriber for whatever premium subscription channels or pay-per-view channels that the subscriber purchases on the system. This represents the current TV model of operation.

Content on the Internet has followed a similar model of operation to date, having users paying to access a site or by the site having sponsors insert advertising into the content on the site. In addition, Internet service or systems providers (ISP) charge a fee for giving the subscriber access to the Internet. In the Internet world, a new model has developed where the users receive a free or reduced charge Internet connection by having advertising messages display in addition to the original screen content.

This invention provides a system and method for television subscribers to receive discounts on their subscriber services by enabling them to rent space on their television and receive advertising messages.

PRIOR ART

There is currently no known art or system which enables the receipt of messages by television users by enabling screen space for these messages that are "in-content" advertising. Most new advertising systems focus on traditional TV model advertising, referred to in this document as "out-of-content" advertising. The closest art is found in U.S. Pat. Nos. 5,325,183, 5,532,735, 6,057,872 and 6,240,555. Most of these patents describe methods of "out-of-content" advertising. However, these methods, like commercials, fall short of providing true simultaneous reciprocation of viewing that the "in-content" advertising that is described herein achieves.

U.S. Pat. No. 5,325,183 to Rhee is the only patent listed above that relates to an "in-content" advertising system. The Rhee patent provides a method for displaying advertising in a television picture; however, this patent does not provide an actual advertising system; it focuses on a method of display from a ROM based system and does not disclose the invention described herein because the Rhee patent does not disclose: 1) a system which provides a discount to the subscriber for viewing the "in-content" advertising; 2) different methods to integrate the advertising message with the television content; 3) means to track and control the messages; 4) provides subscriber control and feedback; and 5) allows the subscriber to recall past messages.

U.S. Pat. No. 5,532,735 to Blahut et al. describes a method of advertisement selection for interactive service, providing a technique for an interactive television system wherein viewers can select a desired level of advertisements. The Blahut system allows for adjusting an amount of a bill of a subscriber to interactive television services based on the amount of advertisements viewed in a show. U.S. Pat. No. 6,057,872 to Candelore is similar in that it uses digital coupons to pay for television services. The digital coupons are rewards for viewing commercial messages. Both the Blahut and the Candelore method use "out-of-content" advertising. Neither Blahut nor Candelore 1) use "in-content advertising", 2) combine the message signal with the video signal, 3) provide for subscriber feedback, 4) allow the subscriber to recall past messages, or 5) provide a means to track and control the messages.

U.S. Pat. No. 6,240,555 to Shoff et al. describes an interactive entertainment system for presenting supplemental interactive content in conjunction with video programs. In its background section, the Shoff patent refers to "Intercast technology" wherein both television programs and Internet data are presented to a viewer in different frames on the same screen. Shoff discloses various configurations for the video and supplemental data screens, including configurations wherein a large video window is surrounded by a supplemental information border in addition to configurations wherein the supplemental data window occupies most of the screen and includes a small video window (see FIGS. 8A-8C). Of note, Shoff specifically describes the use of the supplemental information window to provide such things as informational content related to the video program, a product catalog displaying merchandise related to the program and an interactive trivia game related to the program (see column 11, lines 25-47). However, Shoff does not disclose 1) a system which provides a discount to the subscriber for viewing the "in-content" advertising, 2) different methods to integrate the advertising message with the television content, 3) means to track and control the messages, 4) subscriber control and feedback, and 5) allows the subscriber to recall past messages.

SUMMARY OF THE INVENTION

In accordance with the present invention, there is a new method for use in an interactive entertainment system in which a subscriber receives discounts on services provided for viewing a supplemental video signal that is displayed concurrently with a video content program including the steps of: (1) integrating the supplemental video signal with the video content program and displaying a combined signal that includes both the supplemental video signal and the video content program; (2) monitoring the amount of the supplemental video signal that is viewed by the subscriber;

and (3) providing the subscriber discounts that depend on the quantity of supplemental video signal that is viewed by the subscriber.

Optionally, the step of monitoring the amount of supplemental video that is viewed by the subscriber could include the additional step of requiring input by the subscriber which allows the subscriber to receive discounts. The step of monitoring the amount of supplemental video that is viewed by the subscriber could also include the step of providing a prompt for subscriber input to monitor whether the subscriber views the supplemental video signal. In an exemplary embodiment, this prompt is a video prompt, an audio prompt, or a combination thereof. This step could also include the step of removing the prompt and not providing discounts if the subscriber fails to input a response within a set period of time. The step of requiring input by the subscriber could include the additional step of having the subscriber press a key on a remote control device when prompted to receive the discounts.

The present invention may also provide a first system for the delivery of television programming which discounts the cost of the programming by monitoring the amount of a supplemental video signal that is viewed during the programming. The system may include: (1) a video source connected to a subscriber network to transport a primary video signal; (2) a message source connected to the subscriber network to transport a supplemental video signal; and (3) a receiver connected to the subscriber network to receive both the primary and supplemental video signals and to monitor the amount of the supplemental video signal that is viewed by the subscriber.

In one arrangement of this system, the receiver may also include a display buffer, a receiver control program for transporting the received supplemental video signal to the display buffer, a display interface module for combining the primary video signal with the supplemental video signal stored in the display buffer to produce a combined signal to be transported to the display, and a monitoring program to monitor the amount of the supplemental video signal that is viewed by the subscriber.

Optionally, the monitoring program may require subscriber input to determine the amount of the supplemental video signal that has been viewed by the subscriber. The monitoring program could provide a prompt for subscriber input. This prompt could be a video icon, an audio icon, or a combination thereof. The prompt could be removed if the subscriber fails to input a response within a set period of time. In addition, the message source could transport the supplemental video signal to a single subscriber, a group of subscribers, or all subscribers. Also, the subscriber could change the content of the subscriber signal. In an exemplary embodiment, the supplemental video signal may be advertising messages. It would also be possible to have messages that are stored in the message buffer to be recalled by the subscriber.

The present invention also may provide a second system for the delivery of television programming which discounts the cost of the programming by monitoring the amount of a supplemental video signal that is viewed during the programming. The system may include: (1) a video source connected to a subscriber network to transport a primary video signal; (2) a message source connected to the subscriber network to transport a supplemental video signal; and (3) a source receiver connected to the subscriber network to receive both the primary and secondary video signals, to combine the two signals and produce a combined signal that displays both signals concurrently, and transports the combined signal to a subscriber receiver.

Optionally, the supplemental video signal would require subscriber input to determine the amount of the supplemental video signal that is viewed by the subscriber. The supplemental video signal could provide for a prompt, where in one embodiment, the prompt could consist of a video icon, an audio icon, or a combination thereof. It also could be possible to remove the prompt after a set period of time if the subscriber fails to input a response. The source receiver could transport the combined signal to a single subscriber, a group of subscribers, or all subscribers. The subscriber could also change the content of the supplemental video signal. Additionally, in an exemplary embodiment, the supplemental video signal may consist of advertising messages. The subscriber receiver could also have two-way communication capabilities to be able to receive video signals from the subscriber network and transport subscriber feedback to a system provider. The subscriber could provide feedback through calling an automated phone system, an Internet connection, or by contacting a customer service representative.

The invention also provides a third system for the delivery of television programming which discounts the cost of the programming by monitoring the amount of a supplemental video signal that is viewed during the programming. The system may include: (1) a video source connected to a subscriber network to transport a primary video signal, (2) a message source connected to the subscriber network to transport a supplemental video signal, and (3) a subscriber receiver connected to the subscriber network to receive both the primary and supplemental video signals, to scale the primary video signal to be smaller than the available screen size, and to combine the primary and supplemental video signals to display the two signals concurrently.

In one arrangement of this system, the receiver may also include a display buffer, a receiver control program for transporting the received supplemental video signal to the display buffer, and a display interface module for combining the primary video signal with the supplemental video signal stored in the display buffer to produce a combined signal to be transported to the display.

Optionally, the message source could transport the supplemental video signal to a single subscriber, a group of subscribers, or all subscribers. In addition, the subscriber could change the content of the supplemental video signal. In an exemplary embodiment, the supplemental video signal may consist of advertising messages. The messages could also be stored in a message buffer where the subscriber could recall messages that are stored in the message buffer after they have been displayed. The subscriber receiver could also have two-way communication capabilities and both receive video signals from the subscriber network and transport subscriber feedback to a systems provider.

For a better understanding of the present invention, together with other and further objects thereof, reference is made to the following description, taken in conjunction with the accompanying drawings, and its scope will be pointed out in the appending claims.

DETAILED DESCRIPTION

A system and a method for the delivery of a primary video signal and a supplemental video signal are described herein. The system has three distinct embodiments; however, many of the components are similar. Therefore, the first system is described in detail, wherein a detailed description of the similar components will not be repeated except to illustrate any differences.

Figure 1:
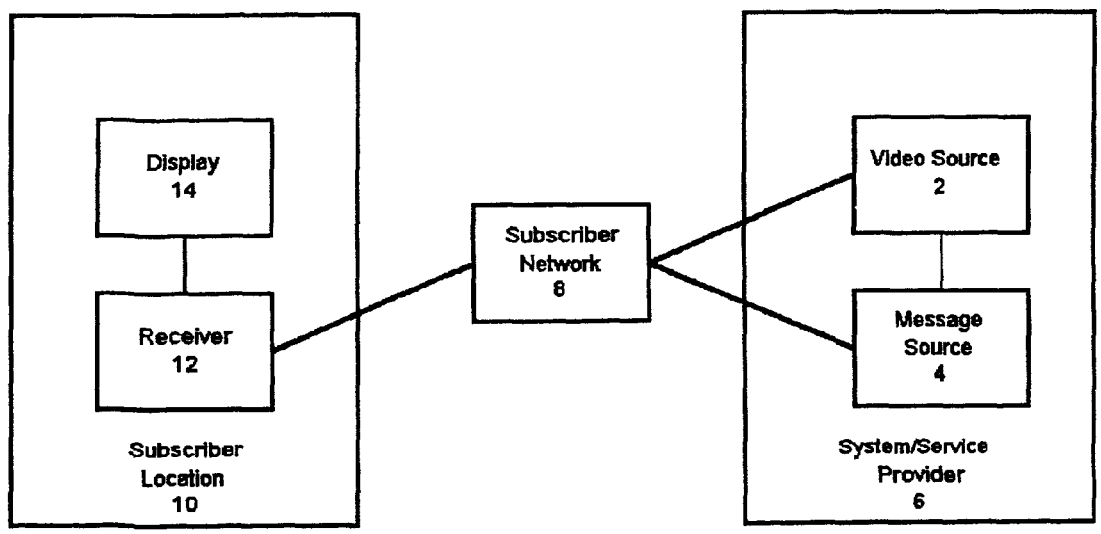
FIG. 1 is a block diagram of a system for the delivery of a primary video signal and a supplemental video signal.

As illustrated by FIG. 1, the first embodiment of the system and the method consists of a video source 2 connected to a subscriber network 8 to transport a primary video signal to the receiver 12, a message source 4 connected to the subscriber network 8 to transport a supplemental video signal to the receiver 12, and the receiver 12 connected to the subscriber network 8 for receiving the supplemental video signal and primary video signal and to provide a combined signal for display. The system would also monitor whether the supplemental signal is viewed by the subscriber to discount some of the costs associated with viewing the primary video signal.

The subscriber network 8 represents a transport system which can carry the primary video signal from the video source 2 to the receiver 12 and can carry the supplemental video signal from the message source 4 to the receiver 12. In one embodiment, the signals could be transported by fiber and then cable connecting to the receiver 12. In an alternative embodiment, the signal from the source could be transported to a satellite or earth base station which would transmit to an antenna or satellite dish that would connect to the receiver 12. It should be noted, and those skilled in the art will appreciate, that the medium used to transport the primary video and the supplementary video may be common, distinct, or a hybrid that includes common and distinct media. The receiver 12 may use the same system to transport back to the source or an alternative transport path. The transport system may also include other media including but not limited to, wireless, wired, or optical techniques.

The subscriber location 10 contains a receiver 12 for receiving both the primary and supplemental video signals from the subscriber network 8. The receiver 12 will operate with two-way communication capabilities to receive a video signal and to receive and to transmit subscriber feedback from and to the system service provider 6. This setup allows a subscriber to purchase pay-per-view movies, use Video-On-Demand commands, view data messages from other applications such as email, or to allow internet web browsing. The receiver 12 can transmit subscriber feedback either through the same pathway that it receives the video signals or through an alternative pathway such as a phone line or an internet connection, or any other type of wired, wireless, or optical media.

A local message source 4 also connects to the subscriber network 8. In one embodiment, the message source is connected via an Internet or Intranet connection and formats these messages for distribution to television subscribers, but other types of connections such as those used to connect the video source to the subscriber network could also be used. The message source 4 may also maintain a list of subscribers to receive each message or certain types of messages based on subscriber profiles.

Figure 2:
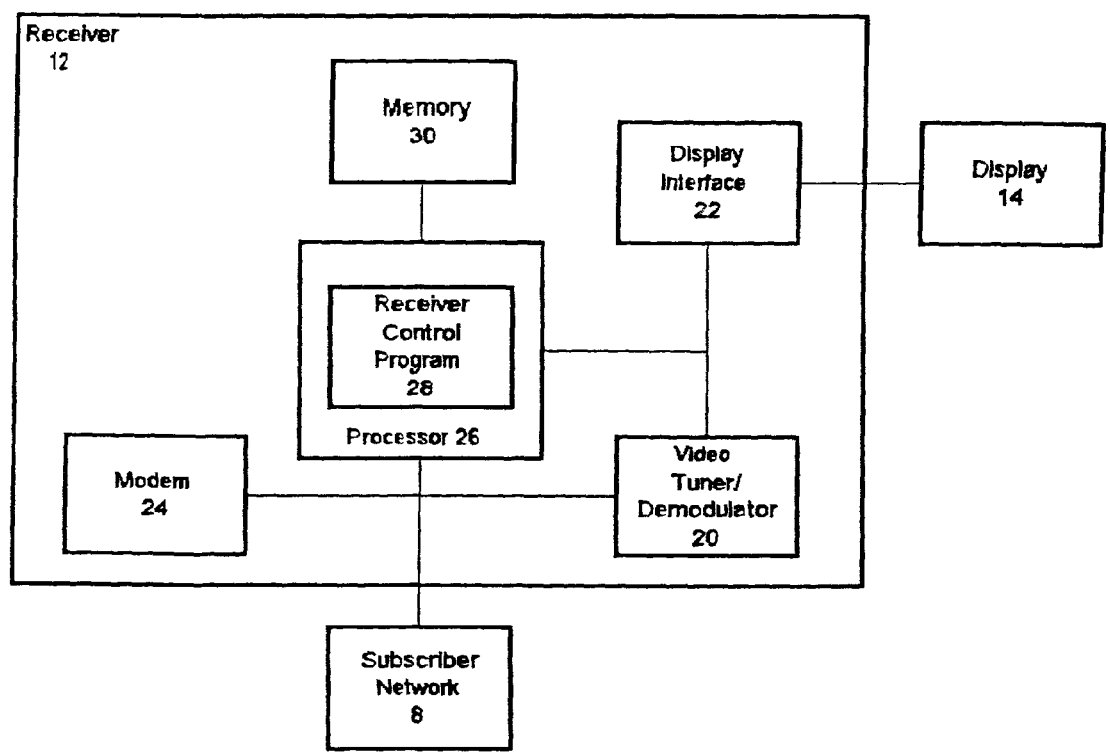
FIG. 2 is a block diagram of a receiver for use in a system for the delivery of a primary video signal and a supplemental video signal.

Further details of the equipment at the subscriber location 10 are illustrated in FIG. 2. In one embodiment of the invention, the receiver 12, as illustrated in FIG. 2, includes a processor 26 and other supporting electronics for running a set-top box receiver control program 28 including memory and registers 30 for use by the set-top box receiver control program 28. The processor 26 connects to a video tuner/demodulator 20, a display interface module 22 and to a modem 24 which connects back to the subscriber network 8. The set-top box control program 28 can be equipped to receive through the modem one way and use another media to send information back to the subscriber network 8 or it could send and receive information through the modem 24. The display interface module 22 connects to the display 14 and the video tuner/demodulator 20. The video tuner/demodulator 20 connects to the subscriber network 8. The set-top box receiver control program 28 runs on the processor 26 and controls the operation of the receiver 12. The video tuner/demodulator 20 receives signals from the subscriber network 8 and demodulates them under the control of the set-top box control program 28 to produce a selected video signal if the subscriber is authorized to view the content. The video signal passes through the display interface module 22 which outputs a display signal to the display 14. The receiver control program 28 connects to an overlay display memory (not shown in FIG. 2) that is part of the registers and memory 30. In one embodiment of the invention, the supplemental video signal from the message source 4 is written to the overlay display memory. The display interface module 22 reads the signal and combines it with the selected primary video signal from the video tuner/demodulator 20 to produce a display signal including both the primary video signal and the supplemental video signal to send to the display 14.

To minimize the distraction from the primary video signal, the display interface module may either make the supplemental video signal overlay in a translucent form, scale or truncate portions of the current video and use the cleared area for the supplemental video signal, or take advantage of aspect ratio differences between film and television and display the supplemental video signal in unused areas.

The receiver 12, by using different types of video tuner/demodulator 20, can receive content signals over several different types of subscriber networks 8, including a phone line using DSL type technology, wireless like satellite, or broadband Cable TV connections. The system works independently of any particular transport technology or video source encoding method, meaning it could work well with satellite or cable and can work on digital or analog video signals.

The invention supports and can work in a wide array of different functioning receivers 12 to practice the embodiments of the invention. This description describes a generic receiver function to give a better understanding of the system. The receiver control program 28 includes three subprograms, a modem control program, a main program to control subscriber operations, and a message display program. Preferably, these three programs are integrated into a single program running on a single processor 26 including the video tuner/demodulator 20, receiver control program 28, memory 30, modem 24, and display interface 22; however, alternatively, these programs can be run on another type of integration circuit or electronic device or on separate processors. Some receivers 12 may operate by different combinations or arrangements of receiver components such as combining the modem 24 with the video tuner/demodulator 20. A different arrangement of receiver components does not impact the system described herein.

The system is capable of using its own standalone transport methods described herein of sending supplemental video signals between the message source 4 and the receiver 12 or any other transport method past or future. For example, different connections could be used to connect back to the message source 4. The modem 24 could receive supplemental video signal from cable TV and send subscriber feedback back to the message source 4 on PSTN (Public Switched Telephone Network). The subscriber using the receiver 12 could also use an alternative method to send a response to the message source; the subscriber could call a Customer Service Representative (CSR) and the CSR could enter the information into the message source 4, the subscriber could call an automated phone system 46 which would connect into the message source 4, the subscriber could complete and return a form which is then keyed or scanned into the message source 4, the subscriber could send information to the message source through the Internet 50, or other communication techniques including but not limited to cellular or paging networks.

The memory and register 30 includes a status buffer, a message buffer, an SMER (subscriber message enable register) for subscriber control over the service, a MSER (message server enable register) for system control of the service, and the overlay display memory. The message display program can write supplemental video signals to the overlay display memory from which the supplemental video signal combines with the primary video signal as described above and displayed on the display 14.

The main program performs the functions of controlling the channel selection through the demodulator 20 and processing commands from a remote control, if present. The supplemental video signal may also be passed to and from the remote control if the remote has the means to process the supplemental video signal.

The modem program runs in parallel with the main program and sends signals generated by the main program to the system or service provider 6 for operating the subscriber or subscription services. In addition, as described below, the modem program receives incoming supplemental video signals and writes them to the message buffer. The modem program also reads the supplemental video signal stored in the message buffer and writes them to the overlay display memory with the result that the supplemental video signal combines with the primary video signal to be displayed as described previously.

The system supports a wide array of methods of processing and displaying the supplemental video signal as described. Of the several ways of processing and displaying the supplemental video signal, only one example will be described in detail.

The message source 4 connects to a subscriber network 8 using common and well-known procedures which connect to a receiver 12. The message source 4 uses a unique predetermined ID to identify itself to the receiver 12. The modem 24 processes the supplemental video signal when it detects the ID of the incoming supplemental video signal from the predetermined message source ID. The system supports a wide array of different supplemental video signal formats to practice the embodiments of the invention. Some example fields include, but are not limited to, supplemental video signal ID, supplemental video signal length, play time, number of repeats, supplemental video signal text, and supplemental video signal graphics.

To deliver the supplemental video signal, the message source 4 sends a supplemental video signal to the receiver 12. The modem program receives the supplemental video signal and writes it to the message buffer. If the buffer overfills, the system will overwrite older supplemental video signals by a predetermined sequence. After downloading a supplemental video signal to the receiver 12 and storing it in the message buffer, the message display program reads it from the message buffer and writes it to the overlay display memory, which subsequently writes it to the display 14 where it can replace the supplemental video signal that was being displayed.

The system will read supplemental video signals in sequence from the buffer, unless otherwise instructed. When the last supplemental video signal has been read, the message display program returns to the first supplemental video signal stored, unless otherwise instructed. The system can tailor the display of each individual supplemental video signal. For example, the system can use a play time field for controlling the preferred time period for displaying the supplemental video signal. After displaying a supplemental video signal for a specified time period, the supplemental video signal can either be sent back to the message buffer or discarded by being overwritten depending on the number of times the message has been displayed. Another example would be a program for controlling the preferred number of times a supplemental video signal is displayed. Each time the program reads a supplemental video signal from the message buffer and successfully is displayed, the program may decrement the number of repeats field. When that number reaches zero, the supplemental video signal is discarded by being overwritten. The system may also control how a supplemental video signal displays on the screen. For example, the system would control where the supplemental video signal overlays on the screen, how the supplemental video signal merges with the current content, or the amount that the primary video signal is scaled down.

The system may also provide a mechanism for the message source to collect status information from the receiver 12 to allow the subscriber 44 to receive discounts on services that are relative to the number of supplemental video signals that are viewed. For example, the receiver display program may maintain a status buffer for the number of supplemental video signals that are displayed. Each time that a supplemental video signal is written to the overlay display memory, the program updates the status buffer. Periodically, the program uploads the status buffer to the message source to ensure that the subscriber is actually viewing the displayed supplemental video signals. The subscriber 44 will have the opportunity to respond, which in turn would allow the subscriber 44 to receive a discount on the services that is relative to the number of supplemental video signal that have been viewed. In one embodiment, the monitoring program requires subscriber input to determine the amount of supplemental video signal that has been viewed by the subscriber 44. The subscriber could be provided with a prompt that requests the subscriber 44 to respond to enable the subscriber 44 to receive discounts on services. Possible examples of subscriber discounts include, cash back, free services such as free premium channels or free pay-per-view, or discounts on services. The prompt could be a video icon, an audio icon, or a combination thereof. The prompt would remain on the display 14 for a set period of time, in one embodiment about 30 seconds. If the subscriber fails to respond within that time period, the subscriber will not receive the discounts. The subscriber could respond using any method that communicates with the systems that provides the discounts. However, in a preferred embodiment, the subscriber would press a button on the remote control which would transport a signal to the receiver 12 which would transport the signal to the system provider 6.

This system could operate on a wide array of subscriber networks. It is possible for the receiver 12 to establish a modem connection to connect to different networks such as telephone, DSL, wireless, or broadband Cable TV using a secondary subscriber network 8 connection. This would allow the receiver to operate applications such as electronic mail, web browsers, or virtual channels. These applications could be combined with the regular video content in the same manner that the supplemental video signal is combined.

The receiver 12 can accept supplemental video signal by a supplemental video signal id field. This will allow the subscriber 44 or the service provider 6 to enable/disable the display of supplemental video signals based on the supplemental video signal id field. This would allow the subscriber 44 to select the type of supplemental video signals that they have an interest in viewing. The message source 4 would be able to override the enable/disable mechanism to display the supplemental video signal.

The message source 4 can also use the subscriber control system to control the content that the subscriber 44 receives or the price that the subscriber 44 pays to receive that content. For example, if the subscriber 44 does not signup, renew, or cancels the service, the message source 4 will not communicate to the system or service provider 6 to grant the receiver 12 access to the content requested by the subscriber 44. The system may control a single channel, a certain group of channels, or all channels. The most straight forward exchange is to have the supplemental video signal display on the channel that the subscriber wishes to view. For example, the subscriber gains access to a Pay-Per-View movie without having to pay an addition charge by having supplemental video signals display while they are viewing that channel. However, the system could also work by having the subscriber 44 view message displays for a period of time to gain access to premium services, such as premium movie channels, web access, or game services.

The receiver 12 works with the message source 4 to control the size, number of overlays on the screen at a time, frequency, and content of the messages. For example, the subscriber 44 may increase or decrease the size or frequency of the supplemental video signal, which may result in an effect on the discount that the subscriber receives for viewing the supplemental video signals. It would also be possible for the subscriber 44 to request certain types of content in the supplemental video signal, such as car insurance or ban other types of service such as credit card advertisements, or request coupons for certain types of purchases. In an exemplary embodiment, the supplemental video signal is advertising messages; however, the system also supports others types of information in the supplemental video signal, such as sport scores selected by the subscriber, stock prices selected by the subscriber, press releases, chat room discussions, system notifications such as promotions or outages, weather information, email notification, email messages, user defined reminders such as spouse's birthday, or program information. The system also provides the function of allowing the subscriber to access past messages by allowing the subscriber to view any messages that are stored in the system.

The receiver 12 could also work inside a television display as an integrated part of the television instead of as an independent unit. It would also be possible to have the receiver 12 work as an integrated part of a computer device such as a PC.

Figure 3:
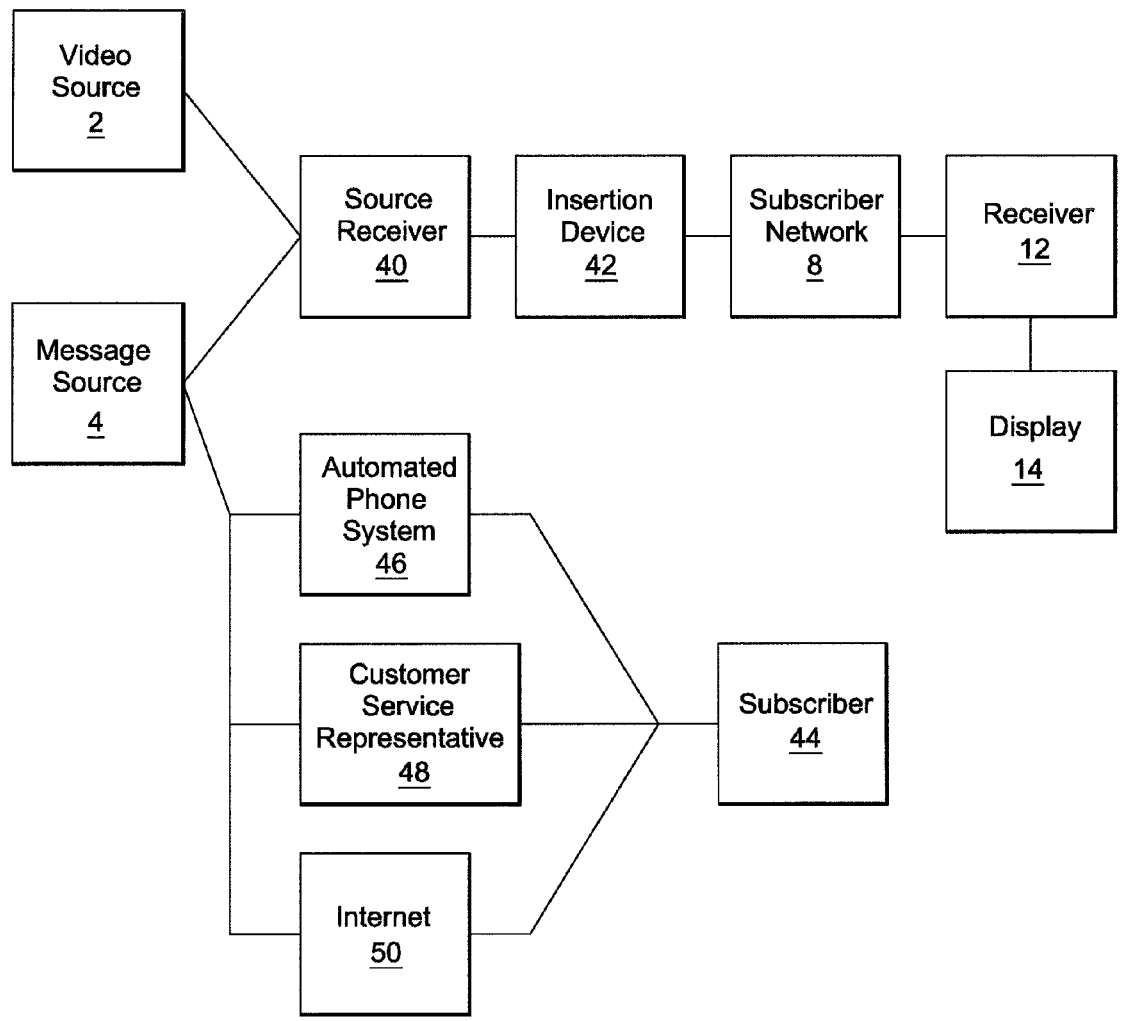
FIG. 3 is a block diagram for a system for the delivery of a primary video signal and a supplemental video signal where the primary video signal is combined with the supplemental video signal before the combined signal reaches the receiver.

FIG. 3 is a block diagram illustrating a second embodiment of the invention. In this embodiment, the primary video signal is combined with the supplemental video signal before the combined signal reaches the receiver 12. In this embodiment of the invention, the video source 2 transmits the primary video signal to a source receiver 40. The message source 4 also transmits the supplemental video signal to the source receiver 40 where the supplemental video signal is combined with the primary video signal. The combined signal is then transferred to an insertion device, like an upconverter, or multiplexer to transmit the combined signal to the subscriber network. This embodiment would support older receivers 12 that do not have complex display interface 22 capabilities to insert the message signal into the video signal. The system would pre-insert the supplemental video signal into the content for receivers 12 that could not handle this function. When this feature is used, the subscriber 44 can still use the other features of the system such as recalling past supplemental video signals or verifying the amount of supplemental video signal that is watched through alternative access methods such as automated phone systems 46, customer service representatives 48, or the internet 50. This type of system supports a subscriber system that does not have a return path through the alternative access methods.

A third embodiment of the system consists of a video source 2 connected to a subscriber network 8 to transport a primary video signal to a receiver 12. A message source 4 is also connected to a subscriber network 8 to transport a supplemental video signal to a receiver 12. The receiver 12 is connected to the subscriber network and receives both the primary and supplemental video signals, scales the primary video signal to be smaller than the available screen size, and combines the primary video signal with the supplemental video signal to display the two signals concurrently.

The first embodiment of the system goes into greater detail describing the components of this embodiment and these components could be used in the way described in the first embodiment. However, the components relating to monitoring the amount of the amount of supplemental video signal that is viewed would not be necessary for this embodiment of the invention and could be omitted.

While there have been described herein what are exemplary embodiments of the present invention, those skilled in the art will recognize that other and further changes and modifications may be made thereto without departing from the spirit of the invention, and it is intended to claim all such changes and modifications as fall within the true scope of the invention.

What is claimed is:

1. An apparatus for providing video content to be rendered on a display having a screen size for the display area, the apparatus comprising:

a primary video signal input that receives a plurality of video signals from a cable television subscriber network and provides a subscriber selected primary video signal;

a supplemental video signal input, separate from said primary video signal input, that receives a supplemental video signal separate from the primary video signal;

a scaler that selects a rendering size to display the subscriber selected primary video signal and scales the subscriber selected primary video to the selected rendering size, wherein the selected rendering size is smaller than the screen size;

a combiner for integrating the scaled subscriber selected primary video signal with the supplementary video signal such that the combined scaled subscriber selected primary video and the supplementary video can be simultaneously viewed within the screen size for the display area;

a video output for providing the combined subscriber selected primary video signal and supplementary video signal for display wherein the supplementary video signal is then displayed in combination with the subscriber selected primary video independent of the subscriber selected primary signal;

a user feedback input for receiving a feedback signal, the feedback signal being triggered by a user action indicating that the supplemental video signal is being viewed by the user; and a controller operative to control access to each primary video signal and thus presentation of each primary video signal, based on the user feedback signal indicating that the supplemental video signal is being viewed.

2. An apparatus for providing video content for display on a display device having a screen size, the apparatus comprising:
- a primary video signal input for receiving a plurality of subscriber oriented television video signals from a primary subscriber video signal source and providing a subscriber selected primary video signal;
- a supplemental video signal input, separate from said primary video signal input, for receiving a supplemental video signal from a supplementary video signal source separate from the primary video signal;
- a scaler for scaling the display size for the subscriber selected primary video signal to a rendering size that is smaller than the screen size;
- a combiner for integrating the scaled subscriber selected primary video signal with the supplementary video signal;
- a video output for providing the combined subscriber selected primary video signal and supplementary video signal for display, wherein the supplementary video signal is then displayed in combination with the subscriber selected primary video independent of the subscriber selected primary signal;
- a user feedback input for receiving a user actuated feedback signal, the user feedback signal indicating that the supplemental video signal has been viewed; and
- a controller operative to control access to each primary video signal and thus presentation of each primary video signal, based on the user feedback signal while the supplemental video signal continues to be displayed.

3. The apparatus of claim 1, wherein the controller is operative to control the provision of the primary video output by enabling the presentation of the subscriber selected primary video only after the feedback signal confirms that a threshold amount of supplemental video signals have been viewed.

4. The apparatus of claim 1, wherein the feedback input for receiving a feedback signal, is operative to receive a feedback signal indicating that a window size for viewing the supplemental video signal has been changed and the controller is operative to control the provision of the subscriber selected primary video output based on such feedback signal.

5. The apparatus of claim 4, wherein the controller is operative to control the provision of the primary video output based the feedback signal by charging a price for the subscriber selected primary video inversely proportional to the window size.

6. The apparatus of claim 4, wherein the feedback input for receiving a feedback signal is further operative to receive a feedback signal indicating the type of content to be included in the supplemental video signal.

7. The apparatus of claim 4, wherein the feedback input for receiving a feedback signal is further operative to receive a feedback signal indicating the type of content to be excluded in the supplemental video signal.

8. The apparatus of claim 1, wherein the video output further provides a prompt to the user to request the user feedback; and
the controller operative to control the provision of the primary video output in one mode if the user feedback in response to the prompt is received and in another mode if the user feedback in response to the prompt is not received.

9. The apparatus of claim 2, wherein the video output further provides a video icon that is presented limited period of time; and
the controller operative to control the provision of the primary video output in one mode if the user feedback is received prior to the removal of the video icon and in another mode if the user feedback is received during the presentation of the video icon.

\* \* \* \* \*